United States Patent Office 3,312,520
Patented Apr. 4, 1967

3,312,520
PROCESS OF TREATING CELLULOSE PAPER HAVING VERY LOW WATER CONTENT WITH ANHYDROUS SOLVENT SOLUTIONS OF PHOSPHOROUS COMPOUNDS CONTAINING POLY(AZIRIDINYL) GROUPS AND RESULTING PRODUCTS
Duane L. Kenaga, Midland, Mich., assignor to The Dow Chemical Company, Midland, Mich., a corporation of Delaware
No Drawing. Filed May 14, 1964, Ser. No. 367,557
8 Claims. (Cl. 8—116.2)

This invention relates to a process for conditioning paper. More particularly, the present invention relates to a process for treating paper with compounds which contain at least two aziridinyl groups attached to a phosphorus atom.

A method of using tris(1-aziridinyl)-phosphine oxide (APO) as a fire retardant for cellulosic fabrics is disclosed in U.S. Patent 3,034,919 to Steinhauer. Other patents dealing with the use of APO in fiber treatment include U.S. Patent 2,859,134 to Reeves et al. and U.S. 2,870,042 to Chance et al.

It has now been found that APO and certain related aziridinyl-phosphorus compounds may be applied to paper from an anhydrous system to produce paper products with improved properties. At a relatively constant dry strength, for example, paper products with improved wet strength may be obtained for a given amount of aziridinyl-phosphorus compound retained on the paper product.

According to the process of the present invention, dry paper (or paper with a low moisture content) is contacted with an anhydrous bath containing APO, a diaziridinyl phosphine oxide, or a bis(aziridinyl)polyethylene glycol diester of phosphinic acid of the formula

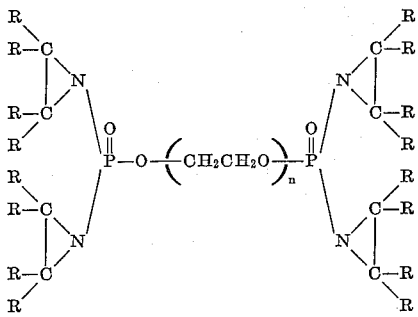

wherein $n$ is an integer of from 2 to 25 (preferably from about 2 to 9) such that the molecular weight of the ester is below about 1500 and each R is selected from the group consisting of the hydrogen atom and a methyl group (e.g., $(C_kH_{2k})H$, where $k$ is 0 or 1).

The operable aziridinyl compounds thus have the formula (I)
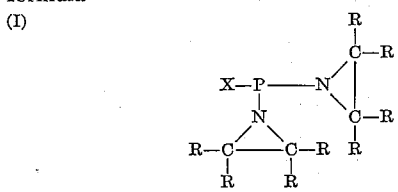

wherein each R is as previously defined and X may be another aziridinyl group (in which case (I) represents APO or a ring-substituted derivative thereof), an aryl- or alkoxy group of from 1 to 13 carbon atoms (such as a phenoxy, tolyloxy, ethoxy, butoxy, pentoxy, dodecyloxy or a tridecyloxy group) or the group

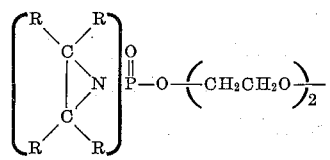

wherein $n$ and each R have the aforementioned definitions. Typical diaziridinyl phosphine oxides which may be used are disclosed in U.S. Patents 2,606,901 and 2,606,902, the teachings of which are herein incorporated by reference.

A preferred subclass of compounds is that in which each aziridinyl group contains from 0 to 2 methyl substituents

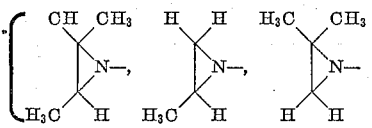

and

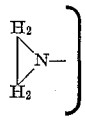

For convenience, the compounds (including APO) which are useful for paper conditioning are designated as "aziridinyl phosphine oxides." Paper which has been contacted with the anhydrous bath for a period of time sufficient to deposit the aziridinyl phosphine oxide compound upon the surfaces and between the fibers of the paper is then cured under anhydrous conditions to produce cross-linking by reaction of the phosphine oxide compounds with the cellulose molecules of the paper and by homopolymerization. The final paper product has high dry strength, exceptional wet strength (wet burst and wet tensile), high fold and good elongation properties. Paper which is treated with these same phosphine oxide compounds in a water system has fair wet strength, but is brittle (low elongation), has decreased dry strength and lower fold quality. The term "paper" as used herein is meant to include cardboard, newspaper and other foldable paper products derived from kraft, sulfite, soda or a similar process.

This invention is based upon the ability of the aziridinyl phosphine oxides of the type herein described to polymerize in the presence of water and yet remain unpolymerized in anhydrous solvents. If paper is treated from a water solution of such aziridinyl phosphine oxide compounds, then much of the material deposited on the paper has already polymerized. This leaves a reduced number of reactive groups which are capable of linking to the molecules of the paper fibers. Moreover, it is desirable to deposit the treating agent only on the surface and in the interstices between the paper fibers. Deposition of the treating agent within the cell wall of the fibers causes the fibers to become dimensionally stable but brittle. This occurs when paper is treated from a water solution of APO. Furthermore, if the paper has a moisture content exceeding about 10 percent, moisture within the fibers tends to extract the aziridinyl phosphine oxides from the anhydrous solution so that polymerization and/or cross-linking occurs within the fiber rather than on the surface of the paper. Since moisture promotes the polymerization of the treating agents and tends to selectively extract the treating agent from anhydrous solutions and deposit it within the swollen cellulosic structure, paper which is as dry as possible gives the best results in the instant process.

In a specific embodiment of the process of the invention, paper (in the form of coherent sheets) with a maximum moisture content of about 10 percent by weight (moisture contents below 7–8 percent are preferred) is contacted with an anhydrous solution containing one or more aziridinyl phosphine oxide compounds for a time sufficient to deposit from about 0.1 to 5 percent (preferably from 0.5 to 3 percent) by weight of the aziridinyl phosphine oxides on the surfaces of the paper. The excess solvent is then removed and the impregnated paper is cured at temperatures of from about room temperature (15°–20° C.) to 270° C. The curing time may vary from about 30 seconds at the higher temperatures to several days for the lower temperatures. For example, curing times of about 8 hours may be employed at temperatures of from 110° to 120° C. while complete cures are obtained after about 4 minutes at 180° C. and after about 12–15 minutes at 140° C. At room temperature, curing times of up to 29 to 30 days have been used. This allows for a slow cure during storage of the treated paper. A suitable curing temperature range which does not require an extensive curing time is from about 140° to 250° C.

The concentration of aziridinyl phosphine oxide in the treating solution may vary from a few tenths of a percent up to about ten percent. The concentration should be sufficient to deposit the required amount of treating compound on the surface of the paper. Any suitable anhydrous solvent may be used. Examples of such solvents include xylene, toluene, benzene, 1,1,1-trichloroethane, carbon tetrachloride, chloroform, ethylene dichloride, ethylene dibromide, perchloroethylene, trichloroethylene, chlorobenzenes, aliphatic naphthas, gasoline, aromatic mineral spirits, n-butane, n-pentane, iso-pentane, ethylbenzene and mixtures of such solvents. By "anhydrous" is meant substantially free of water. Commercial solvents containing minor amounts of moisture dissolved therein may be effectively used in the process.

Tris(1-aziridinyl)-phosphine oxide is a known compound and is disclosed in U.S. Patent 2,891,877 to Chance et al. Phosphine oxide compounds of the formula

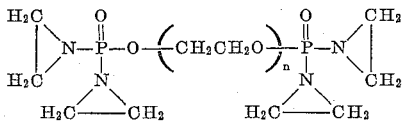

wherein $n$ is an integer from 2 to 25, may be prepared by reacting a polyethylene glycol with $POCl_3$ to form an intermediate tetrahalo compound, followed by reaction of this intermediate with four moles of ethylenimine, as disclosed in copending U.S. application Ser. No. 295,198, filed July 15, 1963, now U.S. Patent 3,270,005. Methyl substituted homologs are obtained by using 2-methyl-aziridine, 2,3-dimethyl-aziridine or 2,2-dimethyl-aziridine in place of ethylenimine. Mixtures of different aziridinyl compounds may be employed to produce compounds with unlike aziridinyl groups in the same molecule.

The following examples are submitted for the purpose of illustration only and are not to be construed as limiting the scope of the invention in any way.

*Examples I–IV*

Filter papers (24 cm. Cenco No. 13250) with predetermined moisture contents were dipped in solutions containing 1 percent and 5 percent by weight of APO in 1,1,1-trichloroethane. The immersion period for each filter paper was approximately ½ minute. After immersion, excess solvent was removed and the impregnated papers were cured at 140° C. for 10 minutes. The treated papers (and controls) were then conditioned at 70° F. and 65 percent relative humidity for two days in order to compare the properties of the papers under identical conditions. At the end of this period, the physical properties of the treated paper (and controls) were determined by the following tests: folding endurance, wet burst factor and dry burst factor.

Folding endurance is a measure of the strength of the treated paper and is recorded as the total number of folds required to sever the paper at the crease when a uniform folding rate (175 double folds per minute) is used. The test employed in the examples is known as the "M.I.T. Folding Endurance" test and is described under TAPPI (Technical Association of the Pulp and Paper Industry) designation T423 m–50.

The bursting strength of paper is defined as the hydrostatic pressure (in pounds per square inch) required to produce rupture of the material when the pressure is applied at a controlled increasing rate through a rubber diaphragm to a circular area of material 1.20 inches in diameter. This test is designated as TAPPI standard T403 m–53. Both wet and dry burst strength are measured by this method. The wet burst strength is measured using a paper specimen which has been soaked in deionized water for 24 hours.

The results of these tests are recorded in Table 1

Table 1

| Example Number | Concentration of APO in 1,1,1-Trichloroethane (percent by weight) | Moisture Content Prior to Treatment (percent by weight) | M.I.T. Fold (avg. No. of folds to sever) | Dry Burst Factor | Wet Burst Factor (24-hour soak in deionized $H_2O$) |
|---|---|---|---|---|---|
| I | 5 | Oven dry (0 percent)[1] | 61.0 | 30.3 | 16.1 |
| II | 1 | ----do---- | 30.8 | 21.6 | 7.1 |
| III | 5 | Approx. 10 percent [2] | 15.0 | 29.6 | 20.8 |
| IV | 1 | ----do---- | 39.0 | 22.0 | 12.1 |
| Control | 0 | Approx. 6–7 percent [2] | 6.8 | 17.8 | 0.2 |

[1] Samples were obtained by heating the filter papers at 105° C. for ½ hour.
[2] Samples conditioned at 65 percent R.H. and 70° F. prior to treatment.

Examples V–XXIV

In a manner similar to that shown in Examples I–IV, paper with varying moisture contents was impregnated with APO, cured and tested. Paper with a moisture content of 0 percent by weight was obtained by drying the sheets at 105° C. for ½ hour in a forced draft oven and dessicating until use. Sheets with a 3.61 percent moisture content were obtained by exposure of the sheets in a cabinet at about 23 precent relative humidity (R.H.) and 80° F. Similarly, sheets with 9.11 percent moisture and 11.4 percent moisture were obtained by exposure in a constant temperature-humidity environment at 65 percent R.H. and 70° F., and 90 percent R.H. at 80° F., respectively. Moisture content is expressed in percentage (grams of moisture per 100 grams of dry fiber).

Each sheet was immersed in 80 milliliters of a solution of APO in 1,1,1-trichloroethane for one minute. The sheet was then drained, blotted and placed in a press on a ½ inch thick piece of felt. A chrome-plated caul (ferroplate) was placed over the sheet. Slight pressure was brought against the assembly. The temperature of the upper platen was controlled at 150° C. for a total cure time of 10 minutes. The felt was dried prior to reuse.

The handsheets used in the tests were prepared from unbleached mixed hardwood soda pulp. The pulp was beaten to an approximate Canadian standard freeness (TAPPI standard T227 m–58) of 400 milliliters. The handsheets were prepared so that 500 24″ x 48″ sheets would weigh approximately 50 pounds.

The results are summarized in Table 2.

TABLE 2

| Example Number | Concentration of Treating Agent in 1,1,1-Trichloroethane (percent by weight) | Moisture Content of Handsheet at Treatment (percent by weight) | Retention of APO in Handsheet (percent by weight) | M.I.T. Fold | Dry Burst Factor (p.s.i.) | Wet Burst Factor (p.s.i.) |
|---|---|---|---|---|---|---|
| V | .00 | 0.0 | 0.0 | 11 | 25.60 | 0.0 |
| VI | 1.00 | 0.0 | 0.47 | 25 | 36.29 | 9.08 |
| VII | 2.00 | 0.0 | 0.41 | 22 | 33.09 | 7.82 |
| VIII | 5.00 | 0.0 | 1.10 | 54 | 42.12 | 15.98 |
| IX | 10.00 | 0.0 | 1.93 | 173 | 42.28 | 20.29 |
| X | .00 | 3.6 | 0.00 | 11 | 25.71 | 0.0 |
| XI | .75 | 3.6 | 0.15 | 18 | 29.01 | 6.37 |
| XII | 1.50 | 3.6 | 0.21 | 25 | 32.50 | 7.67 |
| XIII | 3.75 | 3.6 | 0.58 | 43 | 38.48 | 13.26 |
| XIV | 7.50 | 3.6 | 1.77 | 74 | 43.89 | 21.03 |
| XV | .00 | 9.1 | 0.00 | 8 | 27.80 | 0.0 |
| XVI | .50 | 9.1 | 0.22 | 16 | 29.87 | 6.70 |
| XVII | 1.00 | 9.1 | 0.31 | 17 | 32.26 | 7.96 |
| XVIII | 2.50 | 9.1 | 0.79 | 28 | 34.92 | 13.00 |
| XIX | 5.00 | 9.1 | 2.06 | 58 | 37.74 | 18.20 |
| XX | .00 | 11.5 | 0.00 | 8 | 38.16 | 0.0 |
| XXI | .25 | 11.5 | 0.25 | 16 | 29.12 | 6.11 |
| XXII | .50 | 11.5 | 0.51 | 14 | 30.99 | 7.53 |
| XXIII | 1.25 | 11.5 | 0.91 | 23 | 34.31 | 10.75 |
| XXIV | 2.50 | 11.5 | 1.19 | 24 | 35.00 | 13.18 |

In addition to the properties shown in the tables, paper products prepared according to this invention also have excellent tensile strength properties.

Examples XXV–XXVIII

Handsheets prepared as in Examples V–XXIV were treated using a solution of oxydiethylene bis(1-aziridinyl)-phosphinate

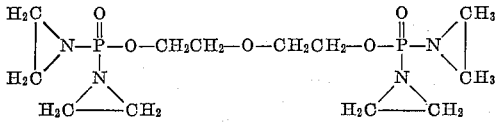

(prepared by reacting $POCl_3$ with ethylene glycol followed by reaction of the intermediate tetrahalo compound with 4 moles of ethylenimine) in 1,1,1-trichloroethane. Results and treatment conditions are recorded in Table 3.

TABLE 3

| Example Number | Concentration of Treating Agent in 1,1,1-Trichloroethane (percent by weight) | Moisture Content of Handsheet at Treatment (percent by weight) | Retention of Oxydi-ethylene Bis(1-Aziridinyl)-Phosphinate in Handsheet (percent by weight) | M.I.T. Fold | Dry Burst Factor (p.s.i.) | Wet Burst Factor (p.s.i.) |
|---|---|---|---|---|---|---|
| XXV | 0.75 | 0.0 | 1.19 | 21 | 33.6 | 10.1 |
| XXVI | 0.75 | 6.2 | 1.04 | 21 | 31.3 | 9.9 |
| XXVII | 3.80 | 0.0 | 5.56 | 130 | 37.3 | 17.4 |
| XXVIII | 3.80 | 6.2 | 5.05 | 84 | 36.8 | 17.9 |
| Control | 0 | (1) | 0 | 9 | 22.9 | 0.5 |

¹ Around 6 percent (untreated).

Examples XXIX–XXXIII

In a similar manner, paper was treated using polyoxyethylene bis(bis(aziridinyl)phosphinate) of the formula

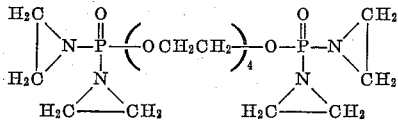

(molecular weight approximately 460, empirical formula $C_{16}H_{32}N_4O_7P_2$). This compound is prepared by the reaction of two moles of $POCl_3$ with one mole of tetraethylene glycol $H(OCH_2CH_2)_4OH$ followed by reaction of the resulting intermediate with four moles of ethylenimine.

Results obtained by treating paper with an anhydrous solution of this compound are recorded in Table 4.

TABLE 4

| Example Number | Concentration of Treating Agent in 1,1,1-Trichloroethane (percent by weight) | Moisture Content of Handsheet at Treatment (percent by weight) | Retention of Polyoxyethylene Bis(Bis-(Aziridinyl)Phosphinate) in Handsheet (percent by weight) | M.I.T. Fold | Dry Busrt Factor (p.s.i.) | Wet Burst Factor (p.s.i.) |
|---|---|---|---|---|---|---|
| XXIX | 8.00 | Approx. 6 percent | 11.50 | 19 | 36.2 | 17.4 |
| XXX | 4.00 | do | 5.12 | 53 | 36.8 | 17.9 |
| XXXI | 2.00 | do | 2.47 | 32 | 35.2 | 13.7 |
| XXXII | 1.00 | do | 1.22 | 24 | 34.3 | 11.0 |
| XXXIII | 0.50 | do | 0.76 | 24 | 33.0 | 8.3 |
| Control | 0 | (Untreated) | 0 | 11 | 27.1 | 0.3 |

In a manner similar to that of the preceding examples, good results are obtained with the following phospshine oxide treating compounds:

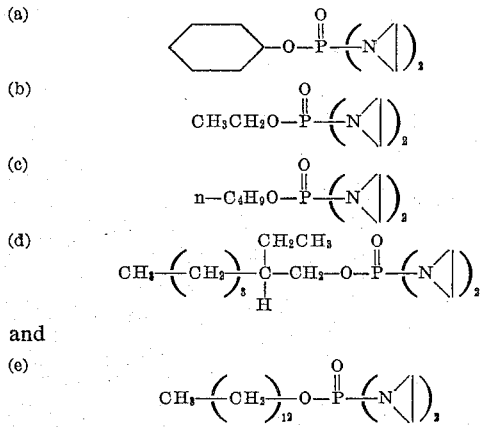

and

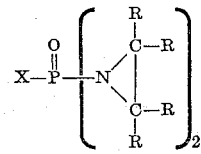

(all unsubstituted carbon atoms have their valences satisfied by hydrogen atoms).

I claim as my invention:

1. A process for treating cellulose paper which comprises contacting cellulose paper having a water content of up to 10 percent by weight with a water-immiscible, inert, anhydrous solution of a water-soluble compound of the formula

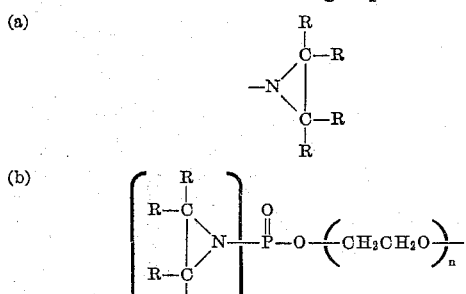

wherein X is selected from the group consisting of:

wherein $n$ is an integer of from 2 to 25, each R is a group of the formula $(C_kH_{2k})H$ in which $k$ is an integer of from 0 to 1 and R' is selected from the group consisting of a monovalent aryl group of from 6 to 7 carbon atoms and an alkyl group of from 1 to 13 carbon atoms, followed by curing the treated paper at a temperature of from ambient room temperature up to 270° C.

2. A process for modifying cellulose paper which comprises contacting cellulose paper having a water content of up to 10 percent by weight with a water-immiscible, inert, anhydrous solution of a water-soluble compound selected from the group consisting of tris(1-aziridinyl)-phosphine oxide and a compound of the formula

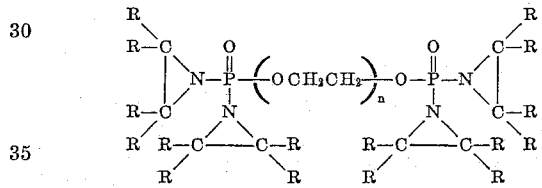

wherein $n$ is an integer from 2 to 25 and R is the group $(C_kH_{2k})H$ wherein $k$ is an integer of from 0 to 1, followed by curing the paper at a temperature of from ambient room temperature to 270° C.

3. A process for conditioning cellulose paper which comprises contacting cellulose paper wherein the water content is up to 10 percent by weight with a water-immiscible, inert, anhydrous solution of tris(1-aziridinyl)-phosphine oxide to impregnate the paper with the anhydrous solution and curing the impregnated paper at a temperature of from ambient room temperature to 270° C.

4. The process of claim 3 wherein the curing temperature is from 110° to 270° C.

5. A process for conditioning cellulose paper which comprises contacting cellulose paper having a water content of up to 10 percent by weight with a water-immiscible, inert, anhydrous solution of a water-soluble phosphine oxide of the formula

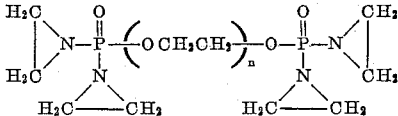

wherein $n$ is an integer from 2 to 9 to impregnate the paper with the anhydrous solution and curing the impregnated paper at a temperature of from 110° to 270° C.

6. A process for conditioning cellulose paper which comprises contacting cellulose paper having a water content of up to 10 percent by weight with a water-immiscible, inert, anhydrous solution of a water-soluble compound of the formula

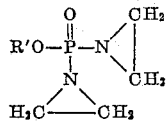

wherein R' is a group of the formula $(C_kH_{2k})H$ in which $k$ is an integer of from 1 to 13 to impregnate the paper with said anhydrous solution and curing the impregnated paper at a temperature of from 110° to 270° C.

7. A process for conditioning cellulose paper which comprises:
(a) contacting cellulose paper which has a water content of up to 10 percent by weight with a solution of up to 10 percent by weight of oxydiethylene bis(1-aziridinyl)-phosphinate in 1,1,1-trichloroethane to impregnate the paper with the solution,
(b) removing excess 1,1,1-trichloroethane solvent from the impregnated paper by evaporation, and
(c) curing the paper product from (b) at a temperature of from 110° to 270° C. for a time period of from 30 seconds to 8 hours.

8. Cellulose paper produced by the process of claim 1.

References Cited by the Examiner

UNITED STATES PATENTS

| | | | |
|---|---|---|---|
| 2,859,134 | 11/1958 | Reeves et al. | 8—116.2 X |
| 2,870,042 | 1/1959 | Chance et al. | 8—116.2 X |
| 2,901,444 | 8/1959 | Chance et al. | 117—136 |
| 2,911,325 | 11/1959 | Drake et al. | 117—136 |
| 3,242,004 | 3/1966 | Kenaga | 117—136 |
| 3,270,005 | 8/1966 | Ingram | 260—239 |

NORMAN G. TORCHIN, *Primary Examiner.*

H. WOLMAN, *Assistant Examiner.*